United States Patent [19]

Morley

[11] Patent Number: 4,743,903

[45] Date of Patent: May 10, 1988

[54] PERIPHERAL VISION ARTIFICIAL HORIZON DEVICE AND ASSOCIATED METHODS

[75] Inventor: Edwin W. Morley, Mississauga, Canada

[73] Assignee: The Garrett Corporation, Los Angeles, Calif.

[21] Appl. No.: 811,986

[22] Filed: Dec. 19, 1985

Related U.S. Application Data

[62] Division of Ser. No. 441,196, Nov. 12, 1982, Pat. No. 4,616,226.

[51] Int. Cl.$^4$ ................................................. G01C 9/02
[52] U.S. Cl. ............................. 340/980; 73/178 R; 350/6.6; 350/486; 356/248
[58] Field of Search ............... 340/980, 705, 794, 795, 340/974; 73/178 R; 350/6.6, 486, 6.1, 484; 356/252, 251, 248, 254

[56] References Cited

U.S. PATENT DOCUMENTS

| | | | |
|---|---|---|---|
| 3,085,429 | 4/1963 | Majendie | 340/980 |
| 4,083,239 | 4/1978 | Malcolm et al. | 340/980 |
| 4,127,850 | 11/1978 | Vallins | 340/980 |
| 4,251,126 | 2/1981 | Minoura et al. | 350/6.6 |
| 4,314,154 | 2/1982 | Minoura et al. | 350/6.6 |
| 4,316,648 | 2/1982 | Lissack | 350/6.6 |
| 4,349,815 | 9/1982 | Spooner | 340/980 |
| 4,376,572 | 3/1983 | Gijzen | 350/486 |
| 4,397,555 | 8/1983 | Malcolm et al. | 340/980 |
| 4,406,525 | 9/1983 | Itoh et al. | 350/486 |
| 4,468,119 | 8/1984 | Hamar | 356/248 |
| 4,478,482 | 10/1984 | Koester | 350/6.6 |
| 4,491,383 | 1/1985 | Pera et al. | 350/6.6 |
| 4,560,869 | 12/1985 | Hien et al. | 350/6.6 |
| 4,616,226 | 10/1986 | Morley | 340/980 |
| 4,637,695 | 1/1987 | Perkins | 350/486 |

OTHER PUBLICATIONS

Instruments and Experimental Techniques, vol. 19, No. 1, pt. 2, pp. 279–281, Jan.–Feb. 1976, (published 8–76), Mamaev et al.

Primary Examiner—Donnie L. Crosland
Assistant Examiner—Brent A. Swarthout
Attorney, Agent, or Firm—Terry L. Miller; James W. McFarland

[57] ABSTRACT

An artificial horizon device producing a projected light bar perceivable with peripheral vision. The device includes a scanner assembly with a pair of rapidly movable scanning mirrors each selectively pivotal about respective mutually perpendicular axes. A beam of light is directed upon a first of the pair of scanning mirrors for reflection upon the second of the mirrors, and thence to illuminate a surface for perception as a relatively movable horizontal reference line. A single adjustment mirror is interposed between the source of the light beam and the first of the scanning mirrors. The adjustment mirror is selectively movable about two mutually perpendicular axes each substantially intersecting the reflective plane of the adjustment mirror in order to set a selected point of incidence for the light beam upon the first of the scanning mirrors. In order to provide for selection of an area upon the surface which is to be illuminated by the scanned light beam independent of scanning of the beam by the scanning mirrors, the device may include a turntable member carrying the entire scanning assembly in pivotal movement about a first axis which is also substantially coincident with the reflective plane of the adjustment mirror. Such independent selection of the area to be illuminated may be further provided by a cradle member carried upon the turntable member and carrying the scanner assembly in pivotal movement about another axis perpendicular to the first axis, and which axis likewise substantially intersects the reflective plane of the adjustment mirror.

10 Claims, 8 Drawing Sheets

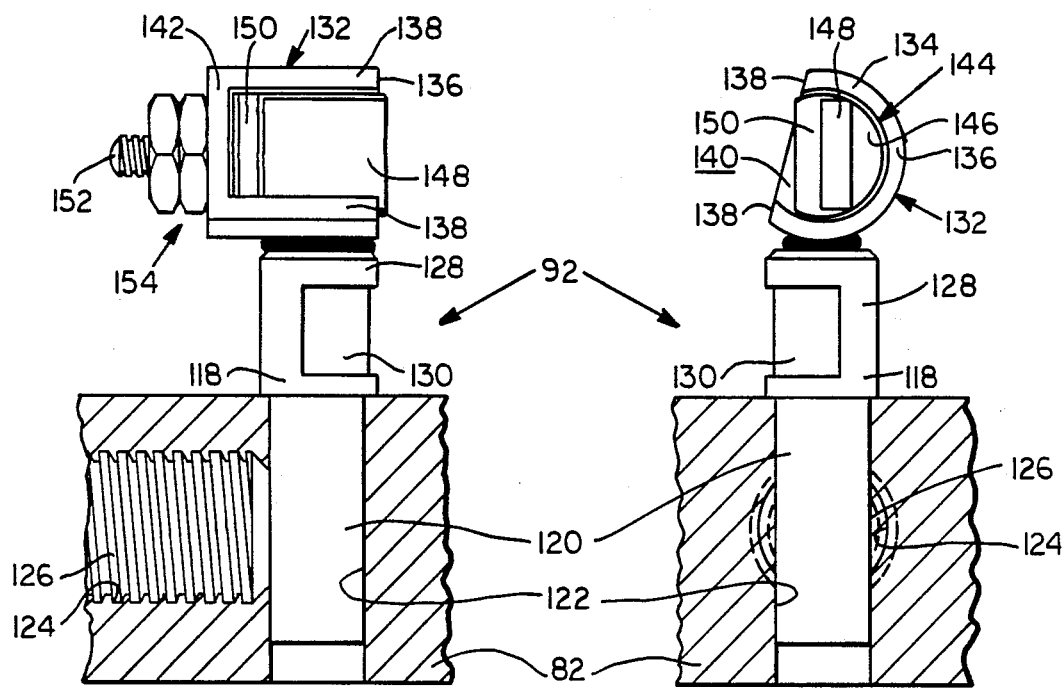
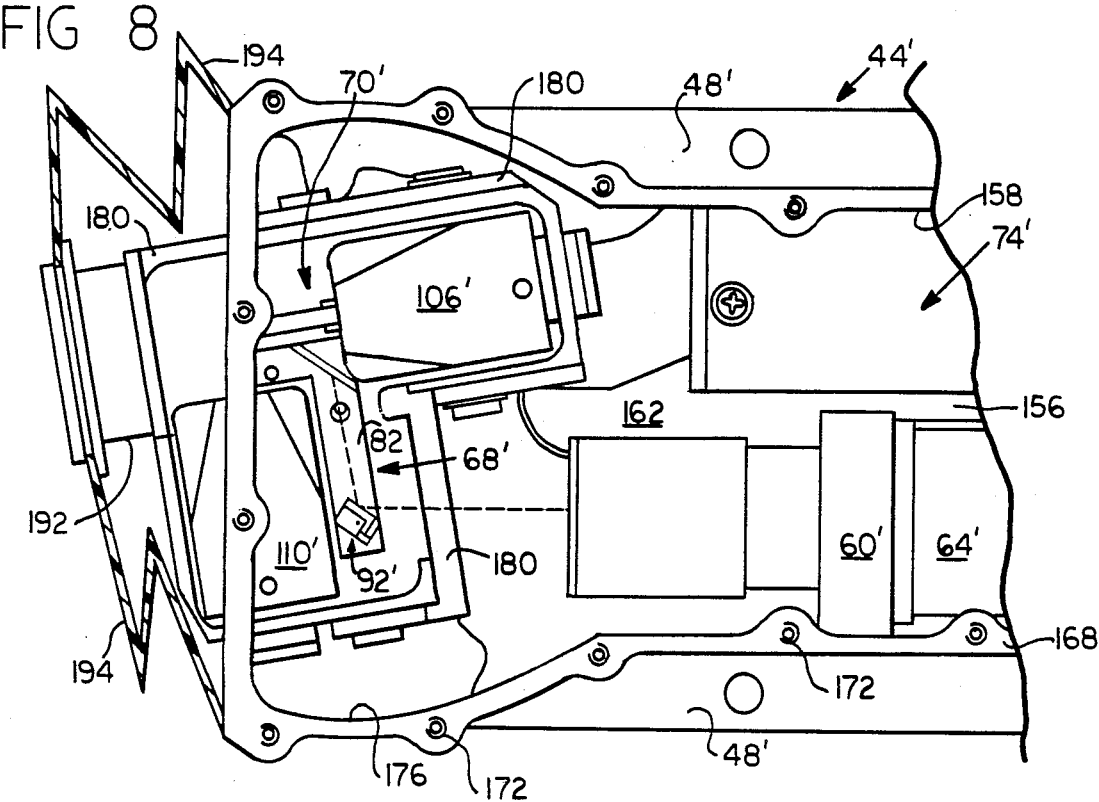

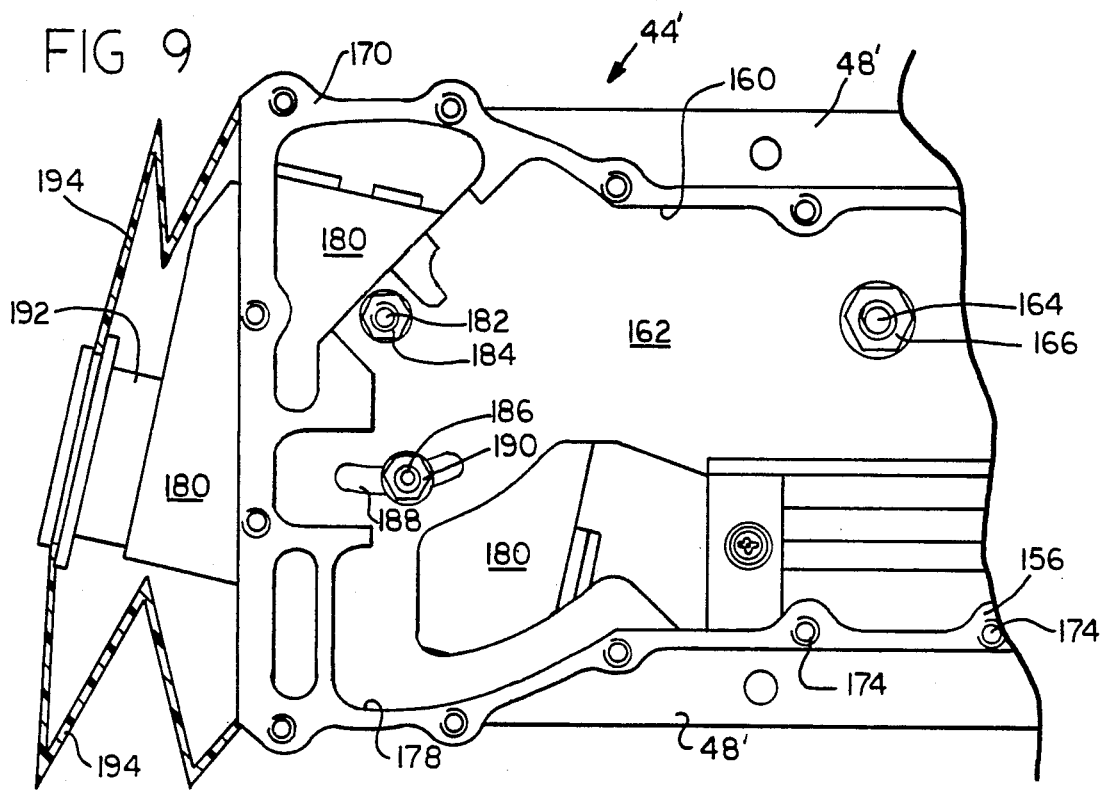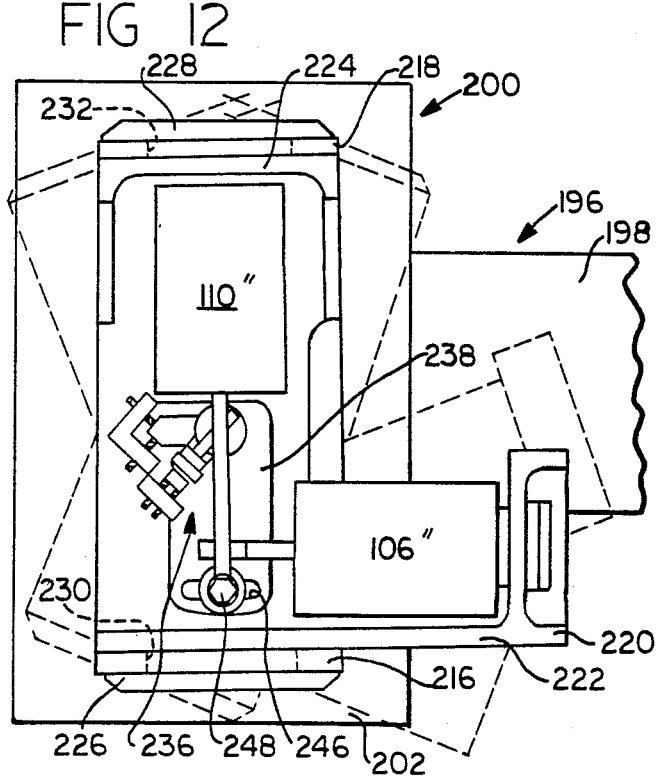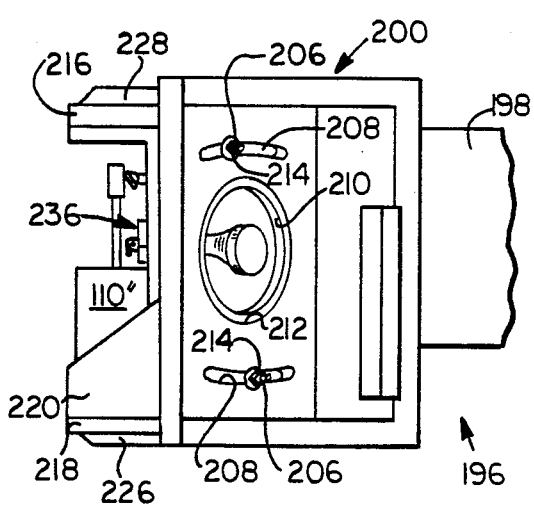

PERIPHERAL VISION ARTIFICIAL HORIZON DEVICE AND ASSOCIATED METHODS

This is a division of application Ser. No. 441,196 filed Nov. 12, 1982, now U.S. Pat. No. 4,616,226.

BACKGROUND OF THE INVENTION

This invention is in the field of artificial horizon devices which project a line of light or light bar onto a surface in front of a pilot. The position and attitude of the light bar is controlled in order to simulate the true horizon. Aircraft, including helicopters, and other craft which move in three dimensions, as well as flight simulators, may include such a device to assist the pilot in controlling the craft.

Conventional aircraft instruments include an artificial horizon instrument which indicates the orientation of the aircraft relative to a horizon. This instrument is generally located on the aircraft instrument panel directly in front of the pilot. When the true horizon is not visible to the pilot the artificial horizon device may be inspected occasionally by the pilot in order to determine the attitude of the aircraft. Such an inspection requires the pilot to use central vision which encompasses a solid angle of about 3 degrees in the center of the visual field. A conventional artificial horizon device in addition to requiring the use of central vision presents only a symbol to the pilot. Such a symbol requires correct perception, decoding, and interpretation before any sense of spatial orientation or motion can be obtained.

On the other hand, peripheral vision is used naturally for sensing orientation and motion. Peripheral vision utilizes dedicated cerberal faculties which recognizes line-like features in the peripheral vision field. Details about the relative movements and positions of these features are conveyed to the center of the brain responsible for motion perception. This inherent perceptual function of the human brain is carried on continuously and automatically during consciousness and requires no conscious thought. thus, any instrument which provides information about attitude and movement through the peripheral vision field will make use of the dedicated faculties and free the pilot's conscious thinking and analytical abilities for other uses.

Because it is not practical to increase the size of conventional artifical horizon instruments so they can be viewed in the peripheral vision field, devices have been developed which project a line of light or light bar onto the aircraft instrument panel in front of the pilot. The light bar is moved on the instrument panel by the device to indicate the position of the true horizon.

One approach to providing a line of light or light bar in front of the pilot and observable by the peripheral vision is to be found in U.S. Pat. No. 4,083,239. A light source is mounted in a housing and one part of the housing is made to tilt and another to rotate thereby moving optical elements which combine to transmit a light bar in front of the pilot. Movement of the parts is related to the aircraft's gyro platform so that the light bar gives a display representing the true horizon at all times. Although this structure is acceptable in some applications, it is not practical in all aircraft primarily because the structure is quite bulky and will not fit readily into the cockpit of existing aircraft. The structure also suffers from the inherent disadvantage concomitant with movement of relatively large mechanical parts in conditions of extreme temperature or acceleration forces. Such disadvantages compromise the use of the device in aircraft such as fighters.

SUMMARY OF THE INVENTION

The present invention is directed to apparatus and methods for directing light from a high-intensity light source onto a surface to define a movable light bar wherein the apparatus has reduced overall dimensions in comparison to conventional devices and is rugged so as to be reliable in the adverse environments of temperature, vibration, and acceleration forces sometimes encountered aboard aircraft.

At the outset, it must be recognized that different and conflicting design criteria apply to various components of the apparatus. For example, it is desirable to mount the high-intensity light source resiliently in order to isolate the light source from aircraft vibration. On the other hand, the components of the apparatus which project the light bar onto the instrument panel must be rigidly attached to the aircraft to avoid positional errors of the light bar caused by vibration and acceleration forces. Further, a fixed and precise relationship of the light source and the projection apparatus must be maintained so that errors in the position of the light bar are not created by alignment shifts of components within the apparatus itself.

The present invention may be defined as a peripheral vision artifical horizon device for projecting light upon a surface in front of a pilot such that said light is perceived as a light bar the position and altitude of which are analogous to a true horizon, said device comprising: a light source providing a light beam, scanning means receiving said light beam for scanning said light beam upon said surface to form a projection perceived as a light bar analogous in position and altitude to a true horizon, and means for adjusting the position of said light beam as received by said scanning means in a first plane and also in a second plane mutually perpendicular with said first plane.

BRIEF DESCRIPTION OF THE DRAWINGS

FIGS. 7A and 7B are fragmentary mutually orthographic views, partly in cross section, of a part of the component assembly illustrated by FIG. 6;

FIG. 8 is a fragmentary top plan view of an alternative embodiment of the invention with parts thereof removed or depicted in cross section for clarity of illustration;

FIG. 9 is a fragmentary bottom plan view partly in cross section of the embodiment of the invention illustrated by FIG. 8;

FIG. 12 is a fragmentary isolated view taken along the line 12—12 of FIG. 11 and looking in the direction of the arrows with parts thereof depicted in alternative operative positions by the use of dashed lines;

FIG. 13 is a fragmentary bottom isometric view of the invention depicted by FIGS. 10–12;

DETAILED DESCRIPTION OF THE PREFERRED EMBODIMENTS

Figure 1:
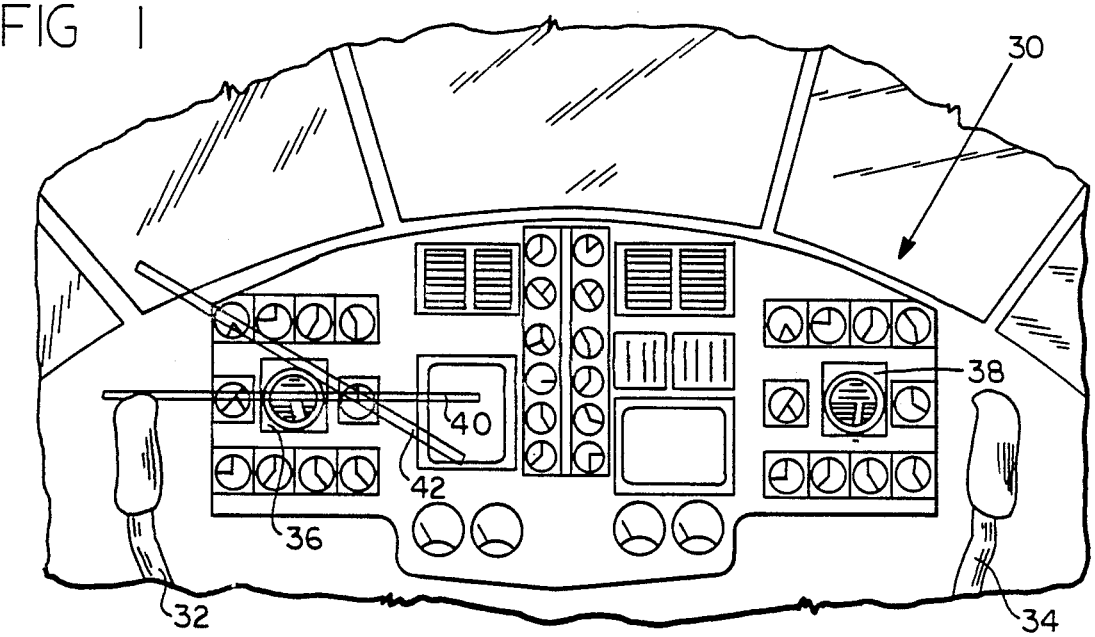
FIG. 1 fragmentarily depicts an aircraft cockpit with the instrument panel and a portion of the aircraft windshield and controls associated therewith.

FIG. 1 depicts an aircraft instrument panel 30 for use by a pilot and copilot who will sit behind the respective controls 32, 34. The various instruments on the instrument panel 30 are generally duplicated both left and right of the center of the instrument panel so that both the pilot and copilot have a complete individual set of instruments. Thus, the instrument panel 30 includes duplicate artificial horizon instruments 36, 38 which are conventionally found on an instrument panel of this type. As explained above, these conventional artificial horizon instruments 36, 38 are relatively small and must be viewed carefully using central vision. Thus, the pilot must not only occasionally concentrate his vision upon the artificial horizon instrument 36, but to do so he must also frequently shift the focus of his vision from the far field through the aircraft windshield to the near field upon the instrument panel 30 in order to perceive the instrument 36.

FIG. 1 also illustrates two positions of a light bar created by a device according to the invention, which is described in greater detail below. The two positions of the light bar are indicated by numerals 40 and 42. In position 40, the light bar is centered on the artificial horizon instrument 36 which serves as a index of aircraft pitch in the particular arrangement depicted. Thus, the aircraft is in horizontal flight with its nose pitched neither up nor down. Further, the light bar in position 40 is parallel with the horizontal sides of the rectangular cases of the various instruments on the instrument panel 30. As a result, the position 40 of the light bar indicates that, in the case of a fixed wing airplane, the wings of the aircraft are level and are not rolled left or right.

In contrast to the above, the light bar in position 42, is above the center of the instrument 36 and is tilted relative to the instrument cases. Thus, position 42 of the light bar indicates that the aircraft is pitched nose down and rolled left wing low in the case of a fixed wing airplane.

It will be evident that two light bars must be provided in an aircraft if the copilot is also to use a light bar. This is because a light bar which extended across the whole instrument panel would tilt down at one side and up at the other side when the aircraft rolled and consequently the pilot and copilot will have different information from the light bar. Two light bars can be provided either by using two peripheral horizon devices of the types to be described or by using one such device with suitable optics which either splits the light into two images or which allows the light bar to be focused either in front of the pilot or in front of the copilot.

Figure 2:
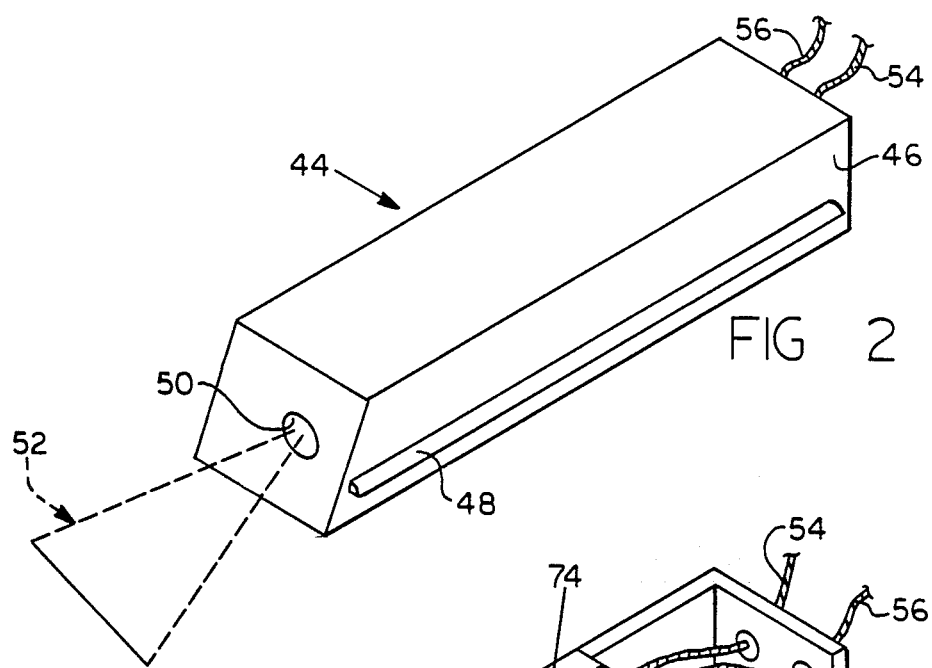
FIG. 2 depicts an external isometric view of an artificial horizon device embodying the invention.

FIG. 2 illustrates an external view of a peripheral vision artificial horizon device 44 embodying the invention. Device 44 includes a housing 46 defining a pair of longitudinal mounting flanges 48 (only one of which is visible in FIG. 2). The device 44 is mountable in an aircraft cockpit by means of fasteners engaging the flanges 48.

Housing 46 defines an exit aperture 50 which is oriented toward the aircraft instrument panel so that light 52 may project from the device 44 to form the light bar on the instrument panel. An electrical power cable 54 extends from the device 44 and receives power from the aircraft. Similarly, an electrical control cable 56 extends from device 44 to receive, inter alia, reference signals from the inertial platform or gyroscope of the aircraft. These inertial or gyroscopic reference signals are employed to derive control commands for scanning the light bar, as is well understood in the pertinent art.

Figure 3:
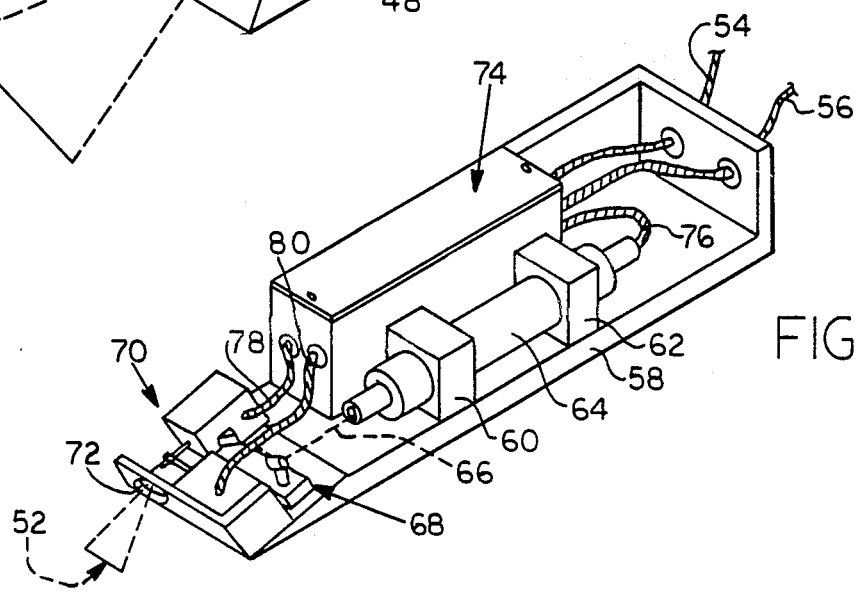
FIG. 3 illustrates a somewhat diagrammatic isometric view of the device depicted in FIG. 2 with a housing portion thereof removed to show internal structural detail.

FIG. 3 depicts the device 44 with the external housing 46 removed to reveal a chassis 58 thereof. It will be noted that the chassis 58 is inverted relative to the position it occupies in FIG. 2 in order to better illustrate details of the structure. The chassis 58 is formed from a single piece of aluminum alloy in order to provide a strong and rigid foundation for the other components of the device 44 while still being light in weight.

Secured to the chassis 58 by a pair of rigid mounting blocks 60, 62 is a high intensity light source 64. The light source 64 is a laser which produces a beam 66 of optically visible light (as is depicted by the referenced dashed line, viewing FIG. 3). The beam 66 projects leftwardly from laser 64 and is received by an optical bridge assembly, generally referenced with the numeral 68, which is described in greater detail infra. The optical bridge assembly 68 communicates the light beam 66 to a scanning assembly generally referenced with the numeral 70, which is also described in greater detail infra. Light beam 66 is then projected leftwardly by the scanning assembly 68 through an aperture 72 of chassis 58 while being scanned both left and right and vertically to produce the light 52 which is perceived as a light bar when it strikes instrument panel 30. It will be understood that the aperture 72 of chassis 58 registers with exit aperture 50 of housing 46 when the chassis and housing are united. In order to complete the general description of the chassis 58, it must be noted that the chassis defines an enclosure 74. The enclosure 74 houses a power supply for the laser 64 as well as control electronics for the scanning assembly 70. Accordingly, cables 54 and 56 enter enclosure 74 and connect to the circuits therein. the circuits within enclosure 74 are similarly connected to the laser 64 and scanning assembly 70 via electrical cables 76, and 78, 80, respectively.

Figure 4:
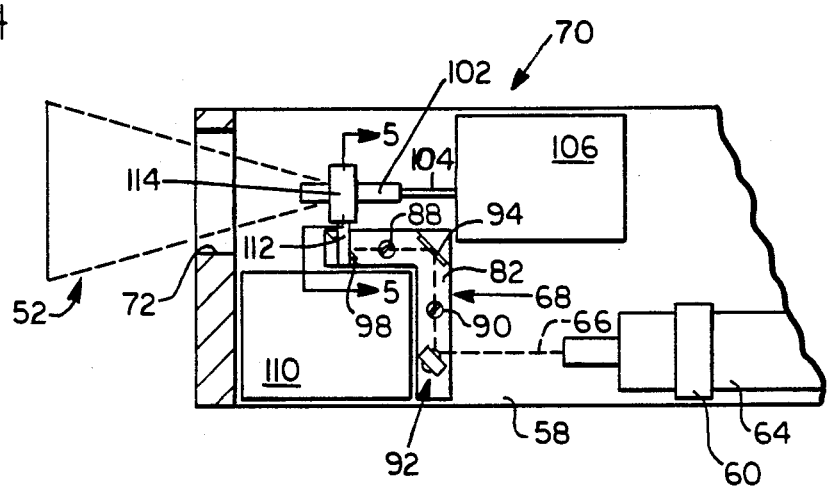
FIG. 4 depicts a diagrammatic fragmentary plan view of a portion of the device illustrated by FIG. 3, partly in cross section.
Figure 5:
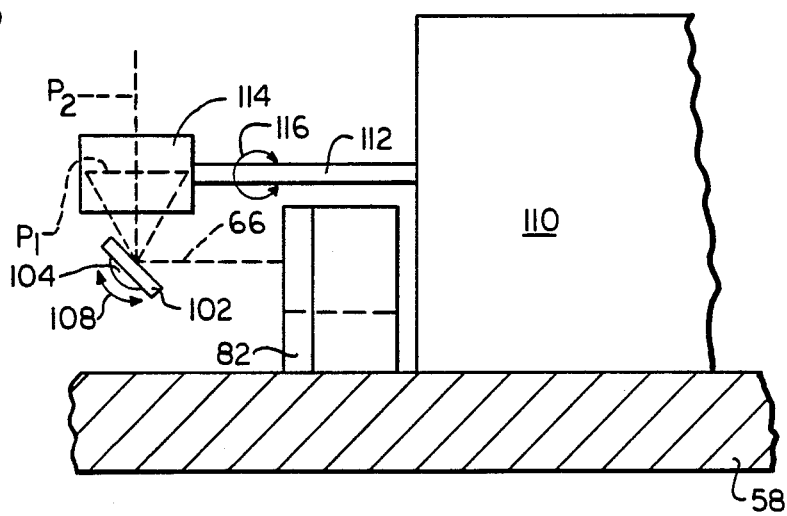
FIG. 5 is a fragmentary cross sectional elevation view taken along line 5—5 of FIG. 4.
Figure 6:
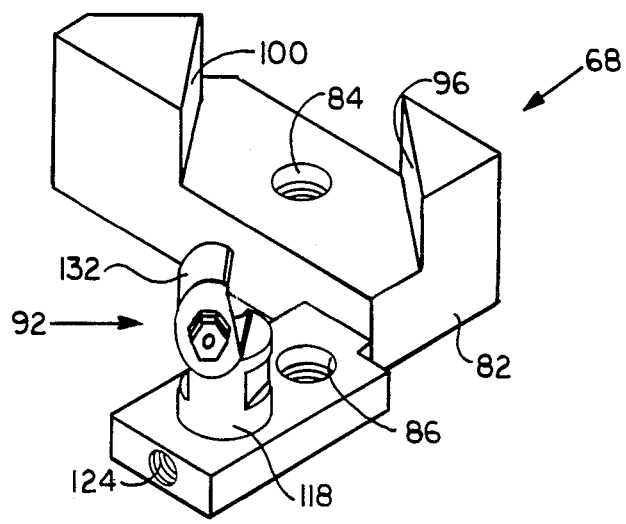
FIG. 6 depicts an isolated perspective view of a component assembly of the device illustrated by FIG. 2-5.
Figure 10:
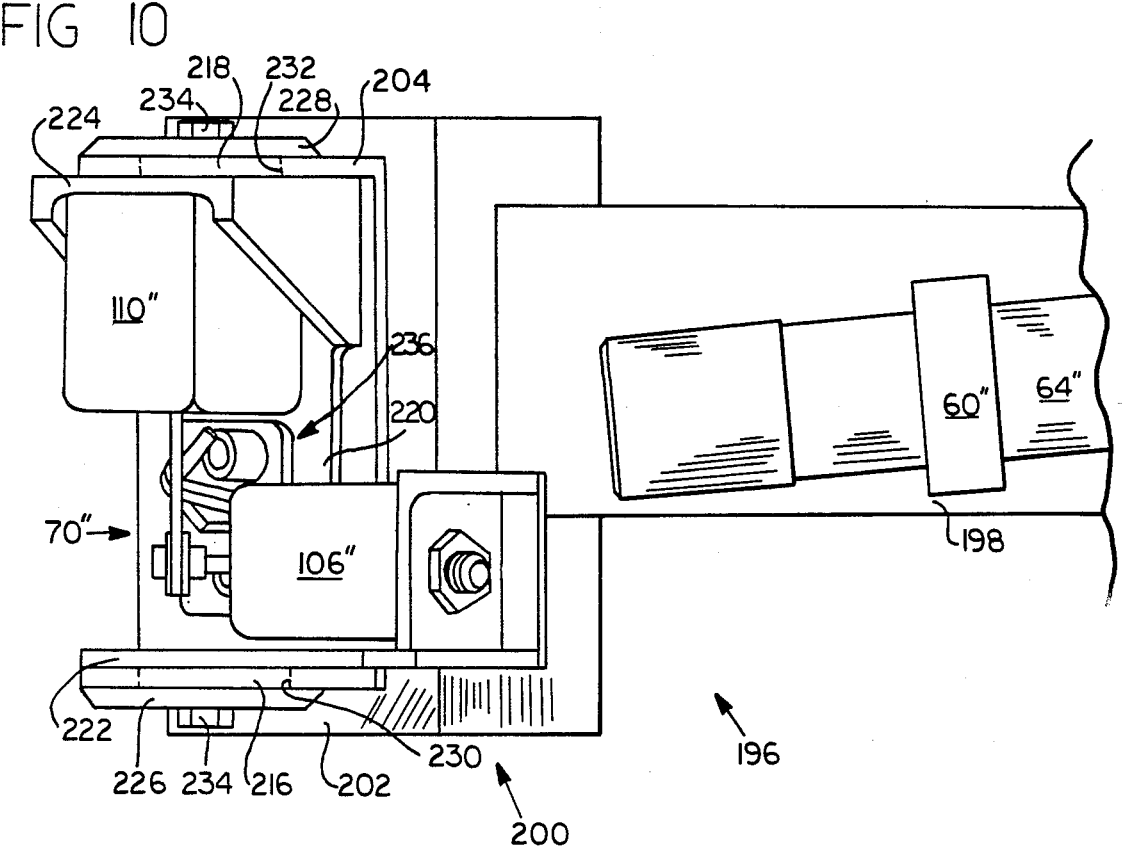
FIG. 10 is a fragmentary top plan view of yet another alternative embodiment of the invention which is illustrated with an external housing thereof removed to better illustrate internal structure.

Considering now FIGS. 4, 5, and 6, it will be seen that the optical bridge assembly 68 comprises a generally L-shaped base member 82. The base member 82 defines a pair of apertures 84, 86 (viewing FIG. 6). A pair of screws 88, 90 are received in the apertures 84, 86 and engage the chassis 58 to rigidly secure the base member 82 thereto (viewing FIG. 4). The optical bridge assembly 68 further comprises an adjustable mirror assembly 92 which is mounted upon the base member 82. The mirror assembly 92 receives the laser beam 66 from laser 64 and reflects it to a first-surface mirror 94 which is adhesively mounted to a mounting surface 96 defined by the base member 82. Similarly, the mirror 94 reflects the laser beam 66 to another first-surface mirror 98 which is adhesively mounted upon another mounting surface 100 of the base member 82. Mirror 98 reflects the beam 66 to a mirror 102 which is carried upon a pivotal shaft 104 of a scanning servo 106 comprising a part of scanning assembly 70, viewing FIG. 5. The nominal position of mirror 102 is, as illustrated in FIG. 5, at an angle of 45° to the laser beam 66 received from mirror 98. The scanning servo 106 pivots the shaft 104 about its axis, as illustrated by arrow 108, to scan the laser beam 66 reflected from mirror 102 in a first plane P1 which is perpendicular to shaft 104. Another scanning servo 110 pivotally carries a shaft 112 having a mirror 114 secured thereto. The mirror 114 is positioned to receive the laser beam 66 reflected from mirror 102 and to reflect the beam so received outwardly through aperture 72, about the axis of the latter, as depicted by arrow 116. The axis of shaft 112 is in the first plane P1 defined by light beam 66 as it passes between the mirrors 102 and 114. Thus, pivotal movement of the shaft 112 and mirror 114 thereon scans the laser beam 66 in a second plane P2 which is mutually perpendicular to the first plane P1 and to shaft 112, viewing FIG. 5. It will be observed that the position of plane P2 shifts left and right on mirror 114 as mirror 102 pivots with shaft 104.

While keeping in mind the structure which has already been described, attention may now be directed to the structure of the adjustable mirror assembly 92 which is illustrated in more particular detail by FIG. 7. The mirror assembly 92 includes a post member 118 having an elongate stem portion 120. The stem portion 120 is circular in tranverse cross section and is received into a matching bore 122 defined by the base member 82. A bore 124 defined by base member 82 is perpendicular to and intersects bore 122 (See also, FIG. 6). A set screw 126 is threadably received in bore 124 so that the right end thereof is engageable with the stem portion 118, viewing FIG. 7A. Further, an enlarged upper portion 128 of post member 118 defines a pair of diametrically opposed wrench flats 130, only one of which is visible viewing FIG. 7.

Secured to the upper end of post member 118, as by welding, is a semi-tubular shell member 132. The shell member 132 includes a circumferentially extending wall 134 which defines on end edge 136 defining an open end for the shell member (The right end, viewing FIG. 7A). Wall 134 also defines a pair of spaced apart side edges 138 which cooperate to define an opening 140 on the shell member 132. An end wall 142 spans and substantially closes the left end of shell member 132. Received within shell member 132 is an adjustable mirror holder member 144. The mirror holder 144 includes a back portion 146 to which is adhesively secured a first-surface mirror 148. Mirror holder 144 also includes an enlarged end portion 150 which abuts end wall 142 of shell member 132. A stem portion 152 of mirror holder 144 extends through an aperture (not visible viewing FIG. 7) which is defined by end wall 142. A pair of lock nuts 154 threadably engage the stem portion 152 to lock the member 144 in a selected position.

In light of the above, it will be appreciated that the laser beam 66 communicating from mirror 98 of optical bridge 68 to mirror 102 of scanner assembly 70 should nominally be incident upon the mirror 102 at the axis of shaft 104 so as to be reflected onto the mirror 114 at the axis of shaft 112. However, a number of physical factors may cooperate to cause inaccuracies in the path followed by the laser beam 66. For example, in serial production of the devices 44, individual lasers 64 may produce laser beams which are off axis or angled slightly with respect to the body of the laser. Further, individual variations in the mounting blocks 60,62 and in the chassis 58 may be additive with any deviations from nominal values which are inherent in a particular laser 64. Still further, it must be remembered that each time the laser beam is reflected from a mirror surface any angular inaccuracy thereof is doubled. Consequently, an angular inaccuracy of, for example, 1 second of angle between the laser 64 and adjustable mirror assembly 92 results in an inaccuracy of 8 seconds of angle in the laser beam 66 as it travels between mirror 98 of optical bridge 68 and mirror 102 of scanner assembly 70. Moreover, the mirrors 94 and 98 also introduce inaccurancies, which in the case of mirror 94 are multiplied by mirror 98. While the surfaces 96 and 100 of optical bridge 82 are nominally parallel in two planes, the mirrors 94 and 98 are adhesively mounted to surfaces 94 and 98, giving rise to the possibility of further inaccuracy in the path of laser beam 66. Thoughtful consideration of the above factors, and of other physical factors of the device 44, will reveal that in some cases these factors could combine to cause the laser beam 66 to miss one of the mirrors 102 or 114 in some pivotal positions thereof.

In order to correct for all of the physical deviations from nominal values inherent in a particular device 44, the adjustable mirror assembly 92 is provided on optical bridge 68. Recalling FIG. 7, it can be seen that the angular position of mirror 148 on mirror assembly 92 is adjustable about a first axis by pivoting of post member 118. Tightening of the set screw 126 against stem portion 120 serves to permanently retain the post member in a selected pivotal position. Similarly, the angular position of mirror 148 is adjustable about a second axis which is perpendicular to the first axis by pivotal adjustment of the mirror holder 144 within shell member 132. Tightening of the lock nuts 154 retains the mirror holder 144 in a selected angular position. Thus, the point of incidence of laser beam 66 upon mirrors 102 and 114 is adjustable in two mutually perpendicular planes by manipulation of the adjustable mirror assembly 92. Because the mirror 148 in mirror assembly 92 is the first reflective surface encountered by the laser beam 66, regular and positional deviations of the beam emanating from the laser 64 can be corrected early in the course of the beam before they are multiplied by repeated reflections of the beam. Further, angular manipulation of the mirror 148 is a powerful tool to compensate for angular inaccuracies downstream in the travel of beam 66. An angular adjustment introduced at mirror 148 is multiplied two fold at each subsequent mirror. Consequently, during serial production of devices 44, inaccuracies in the path of beam 66 resulting from an aggregation of manufacturing tolerances and other factors can be corrected as part of a final adjustment and inspection.

FIGS. 8 and 9 illustrate an alternative embodiment of the invention. Because many features of the embodiment of the invention depicted by FIGS. 8 and 9 are analogous to features described supra. These now familiar features are referenced on FIGS. 8 and 9 with the same reference numeral used above and having a prime added.

A peripheral vision artificial horizon device 44' is depicted by FIGS. 8 and 9. The device 44' includes a combination chassis and housing member 156. A pair of longitudinal mounting flanges 48' defined by the housing member 156 extend from near the left end thereof, viewing the Figures, to the right end thereof (not shown). The housing member 156 also defines an upper recess 158 and a lower recess 160, viewing FIGS. 8 and 9, respectively. A partition 162 defined by the housing member 156 substantially separates the recesses 158 and 160 while defining a number of apertures communicating therebetween. The recess 158 receives a laser 64', which is secured in mounting blocks 60' and 62' (only block 60' being visible in the figures), and also provides access to an electronics enclosure 74' which is defined by the housing member 156. The mounting blocks 60' and 62' are each secured to the housing member 156 by a respective stud 164 extending from each mounting block through the partition 162 to receive a respective nut 166. Housing member 156 also defines a pair of planar surfaces 168 and 170 which respectively circumscribe and define openings to the recesses 158 and 160. A multitude of holes 172, 174 open on the surfaces 168, 170, respectively. In order to substantially close the recesses 158, 160 and to prevent the entry of dust, moisture and other contaminants therein during operation of the device 44' a pair of cover plates (not shown) are sealingly mounted respectively to the pair of surfaces 168, 170 by screws which penetrate apertures in the cover plates and theadably engage the housing member 156 at the holes 172, 174.

At its left end, the housing member 156 is enlarged to define similarly enlarged portions 176, 178 of the recesses 158, 160. A turntable member 180 is pivotally received in the recess portion 176. Turntable member 180 is pivotally secured to the housing member 156 by a pivot stud 182 which passes through a matching aperture in partition 162 and receives a lock nut 184 (viewing FIG. 9). Additionally, another stud 186 extends from the turntable member 180 through an arcuate aperture 188 defined by the partition 162 and receives another lock nut 190. As can be seen viewing FIGS. 8 and 9, a portion of the turntable member 180 extends outwardly of the housing member 156 through a front aperture defined therein which is not visible in the drawings. The turntable member 180 carries an exit tube 192 extending externally of the housing member 156. A flexible bellows member 194 extends from the distal end of exit tube 192 to the housing member 156 to complete environmental sealing of the latter. Further, the exit tube 192 carries an optically transparent glazing so that only light can pass through the exit tube.

Carried upon the turntable member 180 is an optical bridge assembly 68' and a scanning assembly 70'. The optical bridge assembly 68' is disposed upon the turntable member so that the reflective surface of mirror 148 is coincident with the pivot axis defined for the turntable member by pivot stud 182. Consequently, the turntable member 180 may be pivotally adjusted through an arc delimited by the arcuate slot 188 and stud 186 to adapt the device 44' for use in a variety of aircraft. In other words, the limits of the angular range of adjustment of turntable 180 relative to chassis member 156 is set by the cooperative interaction of stud 186 carried by the turntable member and arcuately movable in slot 188 of the chassis member. Because the pivot axis of turntable member 180 in coincident with the reflective surface of mirror 148, pivotal adjustment of the turntable 180 has a predictable effect upon the precise optical alignment of the laser beam 66' on the optical bridge assembly 68' and scanning assembly 70'.

FIGS. 10 through 15 depict yet another alternative embodiment of the invention wherein a peripheral vision artificial horizon device 196 is illustrated with the outer housing thereof removed to better reveal the internal surface of the device. Features of FIGS. 10–15 which are analogous in structure or function to features described supra are referenced with the same numberal used previously and with a double prime added. The device 196 includes a chassis 198 to which a laser 64" is mounted by a pair of mounting blocks, only one of which 60" is visible viewing the Figures.

Figure 11:
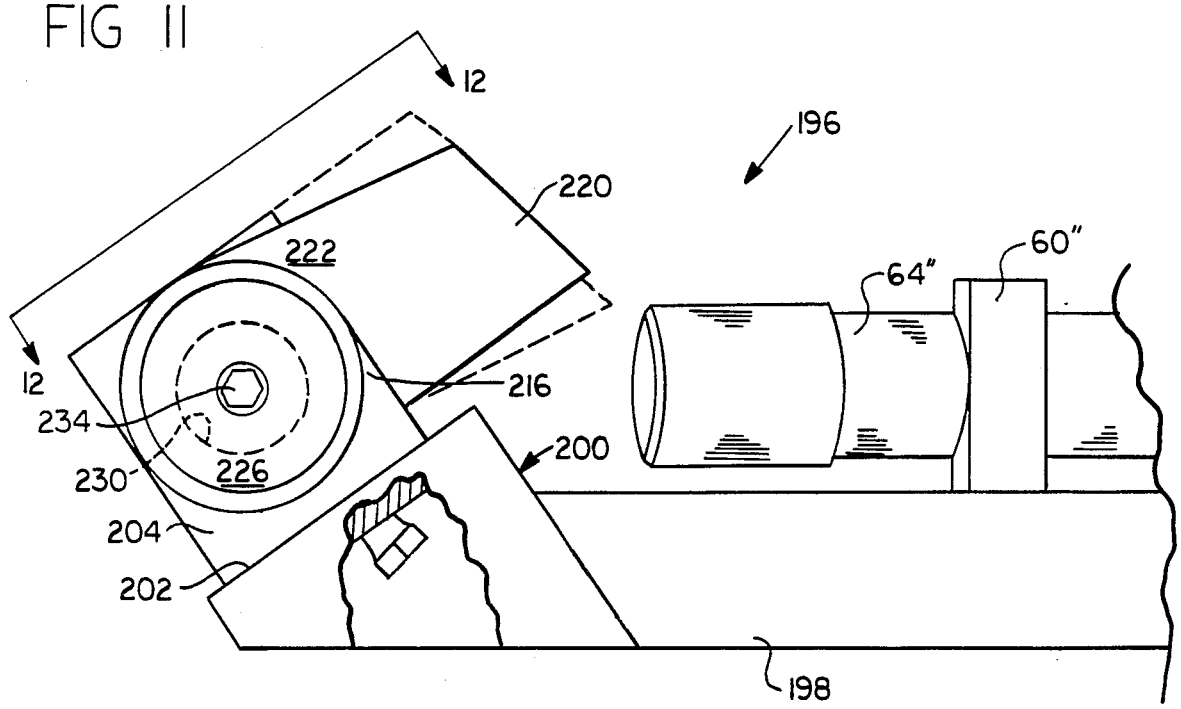
FIG. 11 is a fragmentary elevation view of the embodiment of the invention illustrated by FIG. 10 with a portion thereof broken away for clarity of illustration and with parts thereof depicted in alternative operative positions by use of dashed lines.
Figure 14:
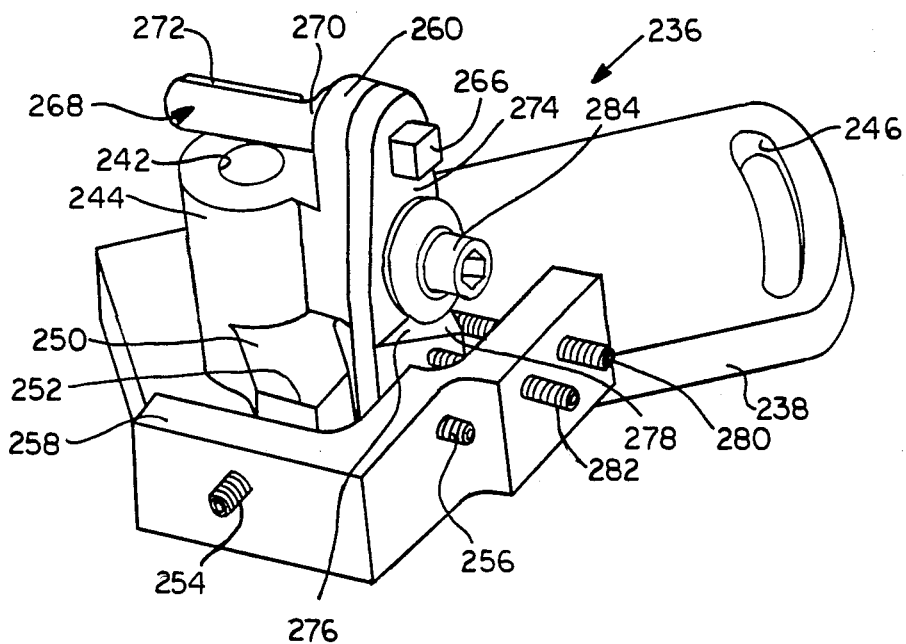
FIG. 14 is an isolated isometric view of a component assembly of the embodiment of the invention depicted by FIGS. 10–13.
Figure 15:
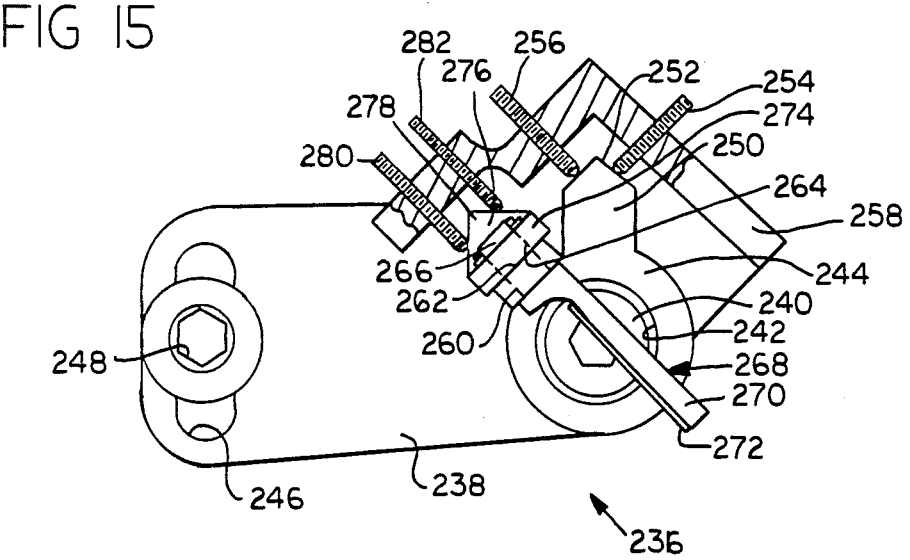
FIG. 15 is a top plan view, partially in cross section, of the component assembly illustrated by FIG. 14.

At its left end, viewing the Figures, the chassis 198 defines an enlarged platform portion 200 defining an upper surface 202 which is inclined downwardly to the left viewing FIG. 11. Pivotally mounted upon the surface 202 is a turntable 204 which is similar in function to the turntable 180 described supra. Viewing FIG. 13, it will be seen that turntable 204 includes a pair of studs 206 which are respectively received in a pair of arcuate slots 208 defined by the chassis 198. The studs 206 and slots 208 are spaced on opposite sides of a tubular boss portion 210 which depends from turntable 204. The boss portion 210 is pivotally received from turntable 204. The boss portion 210 is pivotally received in a matching aperture 212 defined by chassis 198 to define a pivot axis for the turntable 204. The studs 206 each receive a lock nut 214 which is engageable with the underside of chassis 198 to lock the turntable 204 in a selected position on chassis 198.

Further examination of FIGS. 10–13 will show that turntable 204 includes a pair of spaced apart flanges 216, 218 which are parallel and extend upwardly substantially perpendicularly relative to the surface 202 of chassis 198. A cradle member 220 is pivotally received between the flanges 216, 218. Cradle member 220 includes a pair of flanges 222, 224, respectively adjacent the pair of flanges 216, 218. A pair of clamp plates 226, 228, respectively cooperate with the flanges 222, 224 of cradle member 220 to sandwich flanges 216, 218 of turntable 204 therebetween. The flanges 216, 218 each define one of a coaxial pair of circular apertures 230, 232, viewing FIGS. 11 and 12, while the clamp plates 226, 228 each define a matching circular boss (not visible) rotatably received in a respective one of the apertures 230, 232 to define a pivot axis for the cradle member 220. Threaded fasteners, which are generally referenced by the numeral 234, secure the clamp plates 226, 228 to the cradle member 220 to retain the cradle member in a selected pivotal position.

Mounted upon the cradle member 220 is a scanning assembly 70" comprising a pair of scanners 106" and 110". Also mounted upon the cradle member 220 is an adjustable mirror holder assembly 236 which is analogous in function to both the optical bridge assembly 68 and adjustable mirror holder assembly 92 described supra. Giving particular attention now to FIGS. 12 and 14, 15, it will be seen that the mirror holder assembly 236 comprises a base member 238 which is pivotally secured to cradle member 220. In order to define a pivot axis for the base member 238, a bolt 240 (the head of which is visible viewing FIG. 15) passes through an aperture 242 defined by a post member 244 and also through a matching aperture (not visible) defined by base member 238 to threadably engage cradle member 220. Base member 238 also defines an arcuate slot 246. A lock bolt 248 is received in slot 246 and threadably engages cradle member 220. Thus, when bolts 240 and 248 are loose, base member 238 may be pivoted about the axis defined by bolt 240 to a "course" adjustment position on cradle member 220. Tightening of the bolt 248 retains the base member 238 in the selected "course" adjustment position.

As mentioned above, the mirror holder assembly includes a post member 244. Post member 244 is pivotally received upon bolt 240 and includes a toe portion 250 having a generally v-shaped end 252. The end 252 is received between a pair of set screws 254, 256 which are threadably carried by an upstanding flange portion 258 of base member 238. Post member 244 also defines an upstanding ear portion 260 which defines a portion of a planar mounting surface 262. The mounting surface 262 extends vertically downwardly to intersect base member 238. Near its upper end, the ear portion 260 defines an aperture 264. Pivotally received in the aperture 264 is a stem portion 266 of a mirror holder member 268. The mirror holder member 268 includes a head portion 270 to which a first surface mirror 272 is adhesively secured. Stem portion 266 of mirror holder 268 extends beyond the ear portion 260 opposite head portion 270 and is there drivingly coupled with a lever member 274 thereon. By way of example, the stem portion 266 may drivingly engage the lever member 274 by means of a "square drive" type of coupling as is depicted. The lever member 274 is coupled to stem portion 266 and extends downwardly adjacent to surface 262 to terminate in a foot portion 276 adjacent to the base member 238. Foot portion 276 confronts a portion of flange 258 and defines a v-shaped end 278 which is received between a pair of set screws 280, 282 carried by flange 258.

In view of the above, it can be appreciated that device 196 may be adapted for utilization in a variety of aircraft cockpits requiring diverse mounting positions for the device. By pivoting turntable 204 on surface 202 to a selected position, the position of the light bar projected by the device may be positioned in a first plane independently of the movement of the light bar by scanning assembly 70″. Similarly, by pivoting cradle member 220 on turntable 204, the light bar may be positioned in a second plane perpendicular to the first plane and independently of the movement of the light bar by scanner assembly 70″. Further, after the orientation of the scanner assembly 70″ relative to laser 64″ has been determined by pivotal movements of turntable 202 and cradle 220, the adjustable mirror holder assembly 236 may be manipulated to properly direct the light beam from laser 64″ into scanner assembly 70″. As mentioned above, the base member 238 may be fixed in a "course" adjustment position on turntable 220 by tightening lock bolt 248. Further, a "fine" adjustment of the pivotal position of mirror 272 may be effected by loosening one of the set screws 254, 256 and tightening the other of the set screws to pivot post member 244 about bolt 240 and relative to base member 238. Tightening bolt 240 fixes the "fine" adjustment of mirror 272 about the axis of bolt 240. The pivotal position of mirror 272 about the axis of stem 266, which is perpendicular to the axis of bolt 240, may be adjusted by loosening one of the pair of set screws 280, 282 and tightening the other of the set screws. In order to fix the adjustment of mirror 272 about the axis of stem 266, the lever 274 defines a slot (not visible) which receives a lock screw 284 (only a portion of which is visible in FIG. 15). The lock screw 284 is threadably received by post member 244. Thus, tightening lock screw 284 secures lever member 274 to surface 262 to retain the mirror holder 268 and mirror 272 in a selected pivotal position. Moreover, by adjustment of the position of mirror 272 about the axis of bolt 240, the beam from laser 46″ may be adjusted in a first plane as it travels from the mirror 272 to scanner assembly 70″. Similarly, by pivoting of the mirror 272 about the axis of stem portion 266, the laser beam may be adjusted in a second plane which is mutually perpendicular to the first plane.

Figure 16:
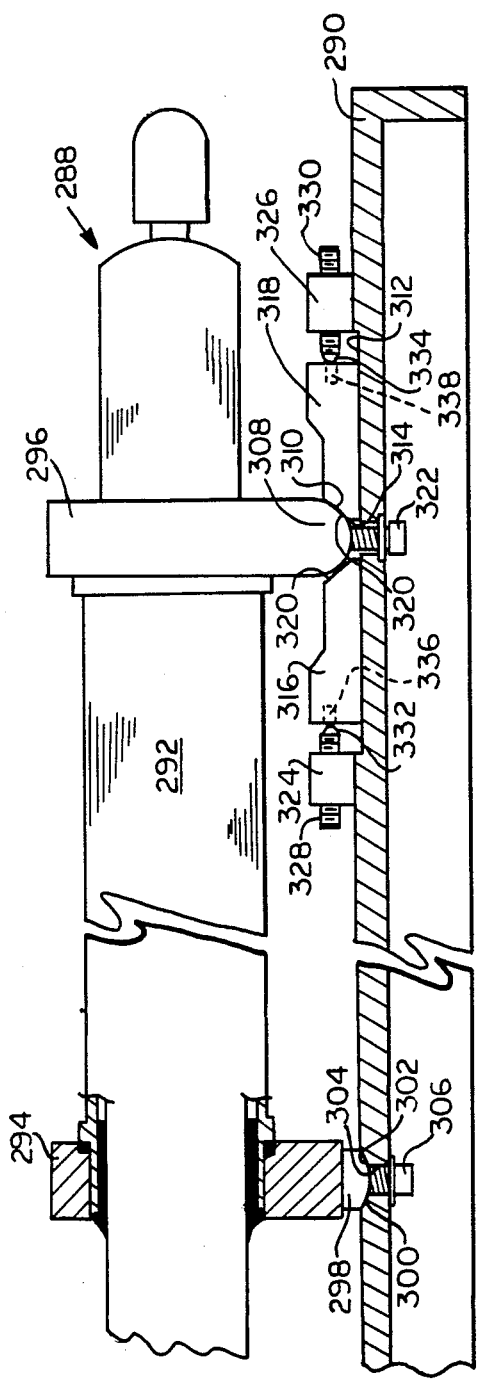
FIGS. 16 and 17 depict fragmentary elevation and plan views of another alternative embodiment of the invention, partly in cross section, and with parts removed from FIG. 17 for clarity of illustration.
Figure 17:
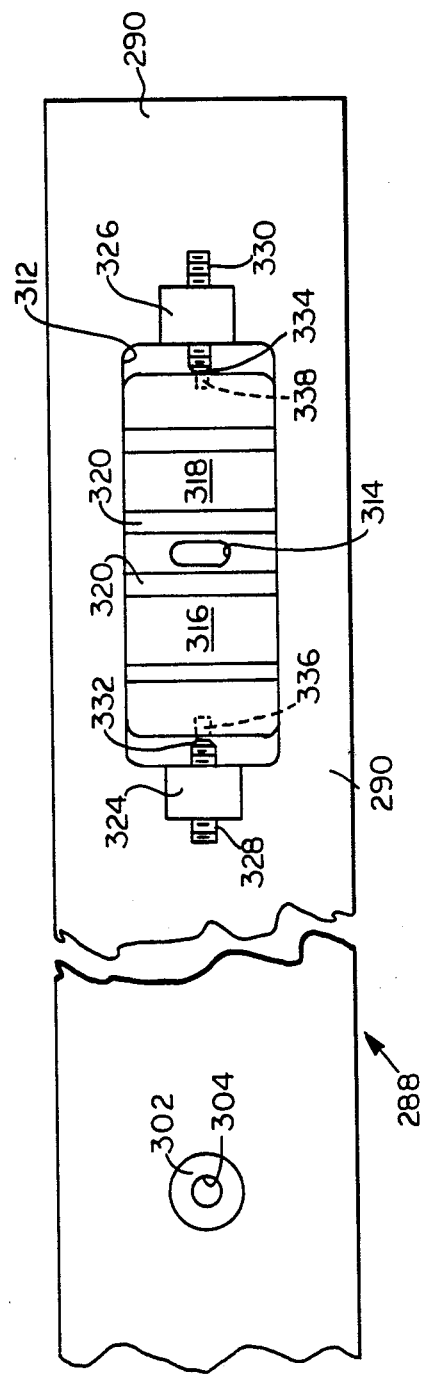
Figure 18:
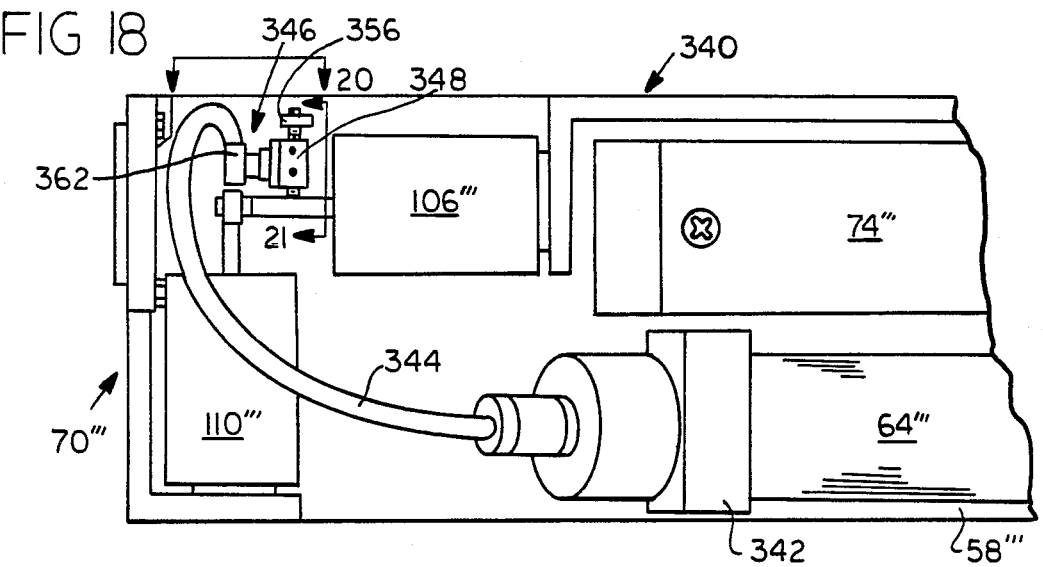
FIGS. 18 and 19 illustrate fragmentary plan and elevation views of still another alternative embodiment of the invention.
Figure 19:
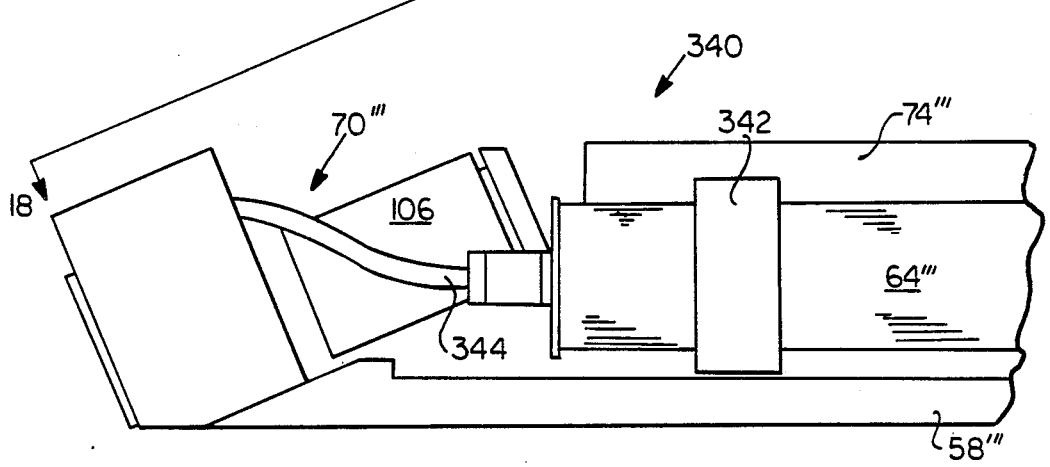

Yet another alternative embodiment of the invention is depicted by FIGS. 16 and 17 wherein an artificial horizon device 288 includes a chassis 290. The device 288 also includes a scanning assembly and an optical bridge (neither of which are illustrated) which are similar to features described above with the exception that the optical bridge contains no adjustment feature such as the adjustable mirror holder assembly 92. The optical bridge of device 288 employs a fixed position mirror in place of mirror assembly 92 of previously described embodiments because errors in the laser beam path within the device 288 are correctable by adjustment of the position of a laser 292 of the device relative to the chassis 290.

Viewing FIG. 16, it will be seen that the laser 292 is secured to chassis 290 via a pair of mounting blocks 294 and 296. The mounting block which is closest to the output end of the laser 292, block 294, includes a foot portion 298 which is circular in transverse cross section and defines a part-spherical lower surface 300. The chassis 290 defines a part-spherical socket 302 receiving the lower end of foot portion 298 and a through bore 304 opening into the bottom of the socket 302. A bolt 306 is received in bore 304 and threadably engages the block 294. Thus, the block 294 cooperates with chassis 290 to define a gimbal or ball-and-socket type mount for the laser 292. That is, the laser 292 is pivotal both in a first plane about the axis of bolt 306 and in a second plane which is mutually perpendicular to the first plane and contains the axis of laser 292, as is more fully explained herein below.

In order to provide both lateral and vertical adjustment of the laser 292 at mounting block 296, so as to move the laser beam produced by the laser 292 in the first and second planes respectively, the mounting block 296 includes a lower portion 308 defining a part-cylindrical surface 310 which is elongate in the direction perpendicular to the plane of FIG. 16. The chassis 290 defines a generally rectangular recess 312 which is elongate parallel to the axis of laser 292. Chassis 290 also defines a through slot 314 which registers with the mounting block 296. A pair of elevation block members 316 and 318 are slidable received in the recess 312. The block members 316, 318 each define an angled surface 320 which engages the surface 310 of block 296. A bolt 322 is received in the slot 314 and extends between the blocks 316, 318 to threadably engage the mounting block 296. Further chassis 290 defines a pair of ears 324, 326 respectively disposed at opposite ends of the recess 312. A pair of set screws 328, 330 are threadably carried respectively by the pair of ears 324, 326 and define ends 332, 334. The set screw ends 332, 334 are rotatably received in matching apertures 336, 338 defined by respective elevation blocks 316, 318.

In view of the above, it will be appreciated that lateral movement of the laser 292 at block 296 to effect movement of the laser beam in the first plane may be accomplished by sliding the surface 310 of the block 296 laterally along the elevation blocks 316, 318 with the bolt 322 moving laterally in slot 314. On the other hand a change in elevation of the laser 292 at mounting block 296 to effect movement of the laser beam in the second plane may be accomplished by tightening or loosening both of the set screws 328, 330 to move the blocks 316, 318 toward or away from one another to respectively raise or lower the laser 292. Tightening of the bolts 306 and 322 fixes the selected position of the laser 296 on chassis 290.

In view of the discussion supra concerning the powerful corrective effect of angular adjustments to the path of the laser beam introduced at mirror holder assembly 92 (recalling FIGS. 1–7), it is easily appreciated that angular adjustments introduced at laser 296 have an even more powerful corrective action because they are multiplied two fold by each subsequent reflection of the laser beam. Thus, in the embodiment of the invention depicted by FIGS. 16 and 17 only small movements of the laser 296 in the first and second planes are required to correct for all manufacturing tolerances affecting the path of the laser beam within a particular device 288.

FIGS. 18–21 illustrate still another alternative embodiment of the invention wherein analogous and now familiar features are referenced with the same numeral used supra and having a triple prime added. FIGS. 18–21 depict a device 340 comprising a laser 64″', and a scanning assembly 70″', both of which are mounted upon a chassis 58″'. However, the laser 64″' is mounted to the chassis 58″' via a pair of mounting blocks of which only one, block 342, is visible in the Figures. The mounting blocks provide resilient mounting of the laser 64″'. Extending between the laser 64″' and scanning assembly 70″' is a fiber optic light cable 344. At one of its ends, the cable 344 is coupled to the laser 64″' so as to receive the beam of laser light produced thereby. At its other end, the cable 344 is carried by and secured in a beam directing assembly which is generally referenced by the numeral 346.

Figure 20:
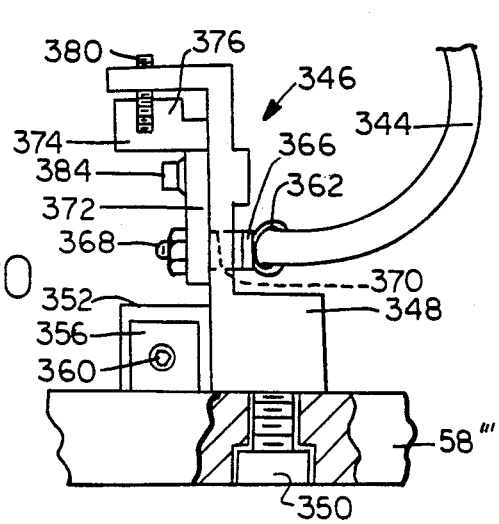
FIGS. 20 and 21 depict elevation views, partially in cross section taken along lines 20—20 and 21—21, respectively, of FIG. 18.
Figure 21:
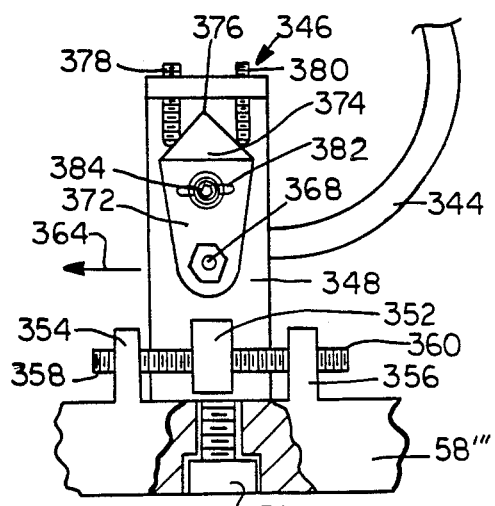

Viewing FIGS. 20 and 21, it will be seenthat the beam directing assembly 346 includes a base member 348 which is pivotally secured to the chassis 58″' by a bolt 350. The base member 348 defines a projection 352 which extends between a pair of ears 354, 356 defined on the chassis 58″'. A pair of set screws 358, 360 threadably engage the ears 354, 356, respectively, and bear against opposite sides of the projection 352.

Carried upon the base member 348 is a beam output assembly 362. The output assembly 362 couples with the fiber optic light cable 344 and contains an optical apparatus projecting laser light received via the cable 344 as a collinated beam which is directed nominally along the axis of the assembly 362 (as in indicated by arrow 364 viewing FIG. 21). The output assembly 362 is carried by a clamp member 366 which includes a stem 368 rotatably received in an aperture 370 defined by base member 348. Secured to the stem 368 is a lever member 372 which defines an end portion 374 having a generally v-shaped end 376. The end 376 is received between a pair of set screws 378, 380 which are threadably carried by the base member 348. Further, lever member 372 defines an accurate slot 382 receiving a lock screw 384. The lock screw 384 also threadably engages the base member 348.

In view of the above, it will be appreciated that the laser beam projected from output assembly 362 (arrow 364) is movable in a first plane about the axis of bolt 350 (that is, in a horizontal plane as depicted in FIGS. 20, 21) by loosening one of the set screws 358, 360, and tightening the other set screw to pivot base member 348 relative to chassis 58″'. Further, the projected laser beam is movable in a second plane mutually perpendicular to the first plane (that is, in a vertical plane as depicted in the drawing Figures) by loosening one of the set screws 378, 380, and tightening the other set screw to pivot the clamp member 366 and output assembly 362 about the axis of stem 368. Consequently, the beam directing assembly 346 allows adjustment of the projected laser beam (arrow 364) so that the latter is positioned properly for receipt by scanning assembly 70″'.

In view of the above, it will be appreciated that the present invention in each of its disclosed embodiments provides an artificial horizon device for projecting a light bar to be viewed by peripheral vision and which satisfies one or the other of the conflicting design criteria applicable to such devices. The embodiments of the invention depicted by FIGS. 1–17 each employ a laser which is rigidly mounted to a chassis, even though the mounting provided may be adjustable as illustrated by FIGS. 16 and 17. Each of the embodiments depicted by FIGS. 1–17 also employs a scanning assembly rigidly mounted to the chassis of the device, through the scanning assembly mounting may also be adjustable per FIGS. 8–15. In order to provide for communication of the laser beam from the laser to the scanning assembly while providing also for adjustment of the optical path of the beam in two planes as it is received by the scanning assembly, the embodiments of FIGS. 1–17 include a two-axis adjustment feature either for an intermediate reflector (FIGS. 1–15) or for the laser itself (FIGS. 16, 17). The adjustment feature in its various disclosed forms is such that it also may be made rigid relative to the chassis of the device. Thus, the embodiments of FIGS. 1–17 rigidly secure all of the beam projecting components of the device to the aircraft so that no positional errors of the light bar are created by inadvertent movements of these components. On the other hand, the embodiment of FIGS. 18–21 provides a scanning assembly which is rigidly secured to an aircraft and a laser light source resiliently mounted relative thereto. Intermediate of the scanning assembly and laser is provided a fiber optic light cable having a fixed relationship with the laser and an adjustable but fixable relationship with the scanning assembly. When the relationship of the light cable relative to the scanning assembly is adjusted and fixed, relative movement between the laser and scanning assembly, for example, because of vibration, has no effect upon the position of the projected light bar. Thus, the embodiment depicted by FIGS. 18–21 may isolate the laser from vibrations and impact forces so as to farther improve the reliability of the device.

While the present invention has been depicted and described by reference to several preferred alternative embodiments thereof, no limitation upon the invention is implied by such reference and none is to be inferred. The invention is intended to be limited only by the scope of the appended claims which provide a definition of the invention.

I claim:

1. A peripheral vision artificial horizon device for projecting light upon a surface in front of a pilot such that said light is perceived as a light bar the position and attitude of which are analogous to a true horizon, said device comprising: a light source providing a light beam, scanning means receiving said light beam for scanning said light beam upon said surface to form a projection perceived as a light bar analogous in position and attitude to a true horizon, and means for adjusting the position of said light beam as received by said scanning means in a first plane and also in a second plane mutually perpendicular with said first plane;

wherein said adjusting means includes light communicating means intermediate said light source and said scanning means for communicating said light beam therebetween;

wherein said light communicating means includes at least a first reflector receiving said light beam from said light source and reflecting said light beam to said scanning means, first means for pivoting said first reflector about a first axis coincident with said light beam so as to move said light beam as received by said scanning means in said first plane, and second means for pivoting said first reflector about a second axis coincident with said light beam and mutually perpendicular with said first axis so as to move said light beam as received by said scanning means in said second plane;

wherein said device includes a chassis member, said light source and said scanning means being rigidly secured to said chassis member, said first means including a post member which is pivotally secured to said chassis member for movement about said first axis, said post member defining a toe portion having a substantially V-shaped end, said V-shaped end being received between and engaged by a first pair of set screws which are threadably carried by a flange member securable to said chassis member, movement of said first pair of set screws being effective to pivot said post member about said first axis, said post member carrying a mirror holder member, said mirror holder member carrying said first reflector, said second means comprising said post member and said mirror holder member pivotally cooperating to define said second axis, said second axis being mutually perpendicular with said first axis and coincident with a reflective surface of said first reflector, said first axis and said second axis intersecting substantially at said reflective surface, said mirror holder member carrying a lever member pivotal therewith, said lever member defining a foot portion having a substantially V-shaped end, said V-shaped end of said foot portion being received between and engaged by a second pair of set screws which are threadably carried by said flange member, movement of said second pair of set screws being effective to pivot said mirror holder member and said first reflector about said second axis, first locking means for locking said post member in a selected pivotal position relative to said chassis member, and second locking means for locking said mirror holder member in a selected pivotal position relative to said post member.

2. The invention of claim 1 wherein said device further includes a portion thereof which is movable relative to a remainder of said device, relative movement of said portion moving the position of said light bar upon said surface in a plane independently of movement of said light bar by said scanning means;

wherein said device further includes another portion which is movable relative to a remainder of said device, relative movement of said another portion moving the position of said light bar upon said surface in another plane which is mutually perpendicular with said one plane independently of movement of said light bar by said scanning means.

3. The invention of claim 1 wherein said device includes a chassis member, said light source and said scanning means being rigidly secured to said chassis, said light communicating means further including optical bridge means rigidly secured to said chassis and having a pair of spaced apart reflectors which are substantially parallel, said first reflector receiving said light beam from said light source and reflecting said light beam to one of said pair of reflectors, said one reflector reflecting said light beam to the other of said pair of reflectors, and said other reflector reflecting said light beam to said scanning means;

wherein said chassis member includes a turntable portion which is pivotally connected to the remainder of said chassis for relative movement about said first axis, said light source being secured to said chassis remainder and said scanning means being carried by said turntable portion, pivotal movement of said turntable portion and scanning means moving said light bar upon said surface in a plane perpendicular to said first axis independently of movement of said light bar by said scanning means;

wherein said chassis member further includes a cradle portion which is pivotally connected to said turntable portion for relative pivotal movement about a third axis which is mutually perpendicular with said first axis, said scanning means being carried by said cradle portion, said third axis intersecting said first axis substantially at a reflective surface of said first reflector.

4. The invention of claim 1 wherein said first means further includes a base member pivotal upon said chassis about said first axis, said base member defining said flange member for threadably carrying said first pair of set screws, and means for locking said base member in a selected pivotal position relative to said chassis.

5. The method of illuminating a selected and variable area of a surface so as to produce for a viewer of said surface a perception of a continuously illuminated line which has a position and attitude analogous to a true horizon, said method comprising the steps of: providing from a light source a light beam having a direction of propagation; adjusting the position of said light beam in a first plane and also in a second plane mutually perpendicular with said first plane to impinge said light beam upon a scanning means at a selected point of the latter, and utilizing said scanning means to project said light beam upon said surface while scanning said light beam across said area at a repetition rate sufficiently great as to cause a perception of continuous illumination of said area;

further including the step of adjusting the position of said selected area upon said surface independently of scanning of said light beam by said scanning means while maintaining said light source stationary;

wherein said independent adjustment step includes the step of pivotally moving said scanning means relative to said surface about a first axis which substantially intersects and is perpendicular with said light beam from said source and prior to incidence of said light beam upon said scanning means;

wherein said independent adjustment step further includes the step of pivotally moving said scanning means relative to said surface about a second axis which is substantially mutually perpendicular with and intersecting both said first axis and said light beam.

6. Apparatus comprising:

a chassis;

a light source mounted upon said chassis, said light source providing a light beam having an axis of propagation;

scanning means mounted upon said chassis for receiving said light beam from said light source and projecting said light beam upon a surface while scanning said light beam both horizontally and vertically to illuminate a selected area of said surface; and means for adjusting the position of said axis of propagation of said light beam as received by said scanning means in a first plane and also in a second plane mutually perpendicular with said first plane, both said first and said second planes being parallel with said propagation axis;

wherein said adjusting means comprises a first reflector receiving said light beam from said light source and reflecting said light beam to said scanning means, and means for selectively moving said first reflector pivotally about a first axis and also about a second axis which is mutually perpendicular with said first axis, movement of said first reflector about said first and said second axis respectively moving said light beam in said first and said second planes;

wherein said selective moving means comprises a post member which is pivotally carried by said chassis to define said first axis, said post member defining means for selective pivotal movement thereof relative to said chassis and carrying said first reflector, said post member and said chassis defining a one cooperating means for constraining relative movement therebetween;

wherein said selective moving means comprises a mirror holder member which is pivotally carried by said post member to define said second axis, said mirror holder member carrying said first reflector, said post member and said mirror holder member defining another cooperating means for constraining relative movement therebetween;

wherein said means for selective pivotal movement includes said post member defining a toe portion extending therefrom substantially perpendicularly to said first axis, said toe portion terminating in a V-shaped end, a first pair of spaced apart elements which are threadably engaged with said chassis for movement relative thereto, said first pair of elements receiving said V-shaped end therebetween, said first pair of elements engaging said toe portion so that movement of said elements relative to said chassis moves said toe portion circumferentially about said first axis to pivot said post member.

7. The invention of claim 6 wherein said mirror holder member carries a lever member pivotal therewith about said second axis, said lever member extending toward said chassis and adjacent to said post member to terminate in a foot portion, said foot portion terminating in a V-shaped end extending away from said post member, a second pair of elements threadably associated with said chassis, said second pair of elements receiving said V-shaped end of said foot portion therebetween and engaging the latter so that relative movement of said second pair of elements moves said foot portion circumferentially about said second axis to swing said lever portion and pivot said mirror holder member about said second axis.

8. The invention of claim 7 further including a base member which is carried by said chassis for pivotal movement about said first axis, said base member threadably carrying both said first and said second pair of elements, said base member and said chassis defining coacting means for constraining relative movement therebetween.

9. Apparatus comprising:

a chassis;

a light source mounted upon said chassis, said light source providing a light beam having an axis of propagation;

scanning means mounting upon said chassis for receiving said light beam from said light source and projecting said light beam upon a surface while scanning said light beam both horizontally and vertically to illuminate a selected area of said surface; and means for adjusting the position of said axis of propagation of said light beam as received by said scanning means in a first plane and also in a second plane mutually perpendicular with said first plane, both said first and said second planes being parallel with said propagation axis;

wherein said adjusting means comprises a first reflector receiving said light beam from said light source and reflecting said light beam to said scanning means, and means for selectively moving said first reflector pivotally about a first axis and also about a second axis which is mutually perpendicular with said first axis, movement of said first reflector about said first and said second axis respectively moving said light beam in said first and said second planes;

wherein said selective moving means comprises a post member which is pivotally carried by said chassis to define said first axis, said post member defining means for selective pivotal movement thereof relative to said chassis and carrying said first reflector, said post member and said chassis defining a one cooperating means for constraining relative movement therebetween;

wherein said selective moving means comprises a mirror holder member which is pivotally carried by said post member to define said second axis, said mirror holder member carrying said first reflector, said post member and said mirror holder member defining another cooperating means for constraining relative movement therebetween;

further including first means for selectively relocating said light beam which is projected by said scanning means in a third plane independently of scanning of said light beam of said scanning means, whereby said area of said surface which is to be illuminated by said apparatus may be selected in said third plane;

wherein said relocating means includes a turntable member pivotally carried by said chassis, said turntable member carrying said scanning means and said adjusting means for movement therewith relative to said chassis;

wherein said apparatus further includes second relocating means for selectively relocating said light beam which is projected by said scanning means in a fourth plane which is mutually perpendicular with said third plane independently of scanning of said light beam by said scanning means, whereby said area of said surface which is to be illuminated by said apparatus may be selected in said fourth plane.

10. The invention of claim 9 wherein said second relocating means comprises a cradle member which is pivotally carried by said turntable member, said turntable member and said cradle member being pivotal relative to said chassis about mutually perpendicular axis, said cradle member carrying said scanning means and said adjusting means for movement therewith relative to said chassis.

* * * * *